Patented Jan. 13, 1948

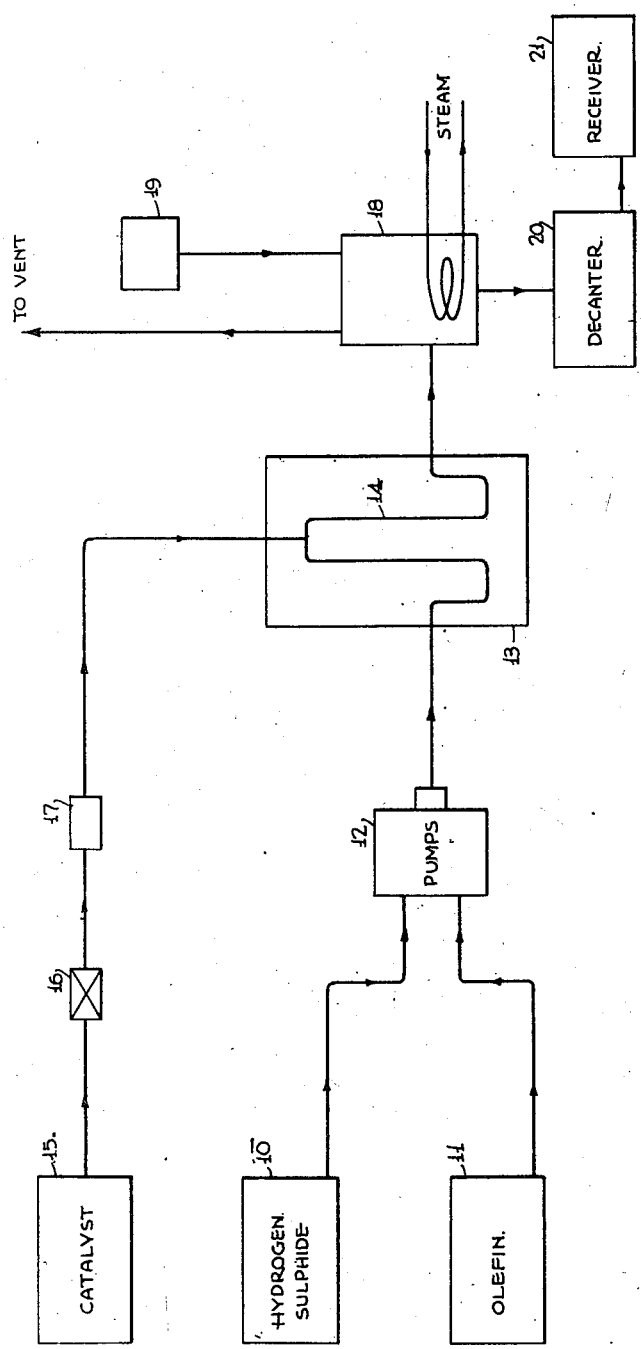

2,434,510

UNITED STATES PATENT OFFICE 2,434,510

CONDENSATION OF OLEFINIC COMPOUNDS WITH HYDROGEN SULPHIDE

John F. Olin, Grosse Ile, and John L. Eaton, Trenton, Mich., assignors to Sharples Chemicals Inc., Philadelphia, Pa., a corporation of Delaware Application January 20, 1943, Serial No. 472,946

8 Claims. (Cl. 260—609)

The present invention pertains to the manufacture of secondary and tertiary mercaptans by condensation of hydrogen sulphide with olefinic compounds. It is an improvement in the process of the prior application of John F. Olin, Serial No. 459,025, filed September 19, 1942, now abandoned, as applied to the manufacture of the products of that application and other mercaptans.. The compounds produced by the invention have been found to be especially useful in controlling polymerization of butadiene, 1,3 and homologues thereof in the manufacture of synthetic elastomers.

The said Olin application describes a process for the manufacture of secondary and tertiary alkyl mercaptans containing between eight and twenty carbon atoms in the alkyl radical; i. e., to the manufacture of compounds which may be considered as aliphatic hydrocarbons substituted at an intermediate carbon atom by a sulfhydryl radical. The manufacture of these compounds is accomplished by reaction between olefins having the desired carbon content and hydrogen sulfide. As described in said application, when an olefin containing a branched chain attached to one of the carbon atoms of the double bond is reacted with hydrogen sulfide in the practice of the invention, the hydrogen sulfide is added to the olefin at the double bond to form the desired tertiary alkyl mercaptan. Similarly, when an iso-olefin having a branched chain attached to a carbon atom close to the double bond is reacted with hydrogen sulfide, a tertiary alkyl mercaptan will be formed by re-arrangement. The term "tertiary olefin" will be used hereinafter to designate such olefins as undergo reaction with hydrogen sulfide to form tertiary alkyl mercaptans either by simple addition of the hydrogen sulfide or re-arrangement and addition.

The invention may be practiced in condensation of hydrogen sulfide with various olefinic compounds, including open chain olefins, cyclo-aliphatic olefins such as cyclo-hexene, and olefins substituted by aromatic, alicyclic or heterocyclic radicals or by inorganic radicals. Among the olefinic hydrocarbons which may be condensed with hydrogen sulphide in the practice of the invention are styrene, indene, turpentine, and the various other hydrocarbons having reactive double bonds at which hydrogen sulphide may be added. In fact, the invention, is applicable to all olefinic compounds capable of undergoing addition reactions of this type. It was developed, however, in connection with attempts to improve the economic conditions involved in condensation of open chain olefins with hydrogen sulphide, and will accordingly be described, for purposes of illustration, as a process of making open chain aliphatic mercaptans by such a process.

In the manufacture of mercaptans by catalytic reaction between hydrogen sulphide and an olefin, the desirable condensation reaction is reversible, as indicated by the following equation,

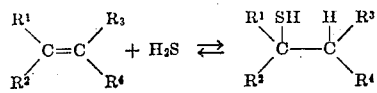

in which $R^1$, $R^2$, etc. represent the same or different alkyl, hydrogen or an aryl or heterocyclic radical, and in which SH is the sulphydryl radical. As a consequence of this reversibility, the degree of conversion attainable is limited by the concentration of reactants as well as the activity of the catalyst. Catalysts employed to promote this reaction also promote polymerization and depolymerization of the olefin under treatment. The conversion of a part of the olefin to be condensed with hydrogen sulphide into a lower olefin decreases the yield for at least two reasons. In the first place, polymerization or depolymerization involves conversion of the olefin of the carbon content desired into an olefin which cannot be condensed with the hydrogen sulphide to produce the desired mercaptan. Secondly, the olefin resulting from polymerization or depolymerization condenses with hydrogen sulphide to produce a considerable quantity of mercaptan of carbon content other than that desired. This results in loss of effective use of both olefinic material and hydrogen sulphide in practice of the process, and also causes a chemical equilibrium to be established at a point at which a smaller proportion of the desired mercaptan has been formed than would be the case if the polymerization and depolymerization reactions could be eliminated during condensation of the olefin with hydrogen sulphide.

A feature of the present invention consists in the fact that it involves practice of a condensation reaction of this type with the aid of catalysts which are capable of promoting the desired condensation reaction while reducing the degree of polymerization or depolymerization, as compared to prior art catalysts. By the use of these catalysts, which are the various halide catalysts capable of causing polymerization and depolymerization of olefins, it is possible to effect the desired condensation reaction at lower temperatures than have heretofore been feasible in reasonably rapid condensation of olefins with hydrogen sulphide. In view of the fact that the use of these catalysts enables the operator to conduct the reaction at these unusually low temperatures, the condensation reaction is favored at the expense of the competing polymerization or depolymerization, in spite of the fact that the catalysts used are capable of catalyzing either type of reaction.

Among the catalysts which have been found to be most useful in practice of the present invention are hydrogen fluoride, boron fluoride, aluminum chloride, beryllium chloride, zinc chloride, boron chloride, phosphorous penta-fluoride, arsenic trifluoride, stannic chloride, titanium tetra-chloride, and antimony penta-fluoride.

The catalysts discussed above have the capacity of causing condensation of hydrogen sulphide with olefinic compounds such as discussed above at temperatures below 50° C., and in the practice of the invention, the reaction should always be conducted below 100° C. in order to minimize polymerization or depolymerization. It is ordinarily preferable that the reaction be conducted at extremely low temperatures; e. g., below 10° C., and for very best results, it is conducted at temperatures below 0° C. Excellent results in practice of the invention have been attained in condensation with hydrogen sulphide of olefins capable of giving tertiary mercaptans, and the use of the unusually low temperatures discussed above is especially indicated in connection with such operations. Thus, in condensing tertiary olefins containing between 8 and 20 carbon atoms as described in the prior application of John F. Olin, Serial No. 459,025, the use of these catalysts and temperatures below 10° C. has resulted in greatly improving the yields and conversions attainable. Slightly higher temperatures are required in the case of condensation of straight chain olefins to give secondary alkyl mercaptans than in the case of condensation of branch chain olefins to give tertiary alkyl mercaptans, but even in the manufacture of secondary alkyl mercaptans, it is best to maintain the temperature below 50° C. during the condensation reaction.

In view of the reversibility of the reaction between the olefin and the hydrogen sulphide, it is desirable that the catalyst be removed promptly from the reaction mixture in order to minimize reversion, and this is accomplished by washing the reaction mixture with an aqueous alkali metal hydrosulphide solution.

In the manufacture of tertiary dodecyl mercaptan from tri-isobutylene or of other mercaptans containing between 8 and 20 carbon atoms from corresponding polymerized olefins, excellent results have been attained at temperatures below 0° C. by the use of from ½ to 2% (preferably between 1 and 2%) of boron fluoride based on the total quantity of the reaction mixture, the use of this catalyst and these temperatures being especially favorable to attainment of equilibrium conditions involving production of a large quantity of mercaptan as compared to undesired by-products. With less effective catalysts, it is desirable that larger amounts be employed. When zinc chloride, for example, is used as the catalyst, it is recommended that an amount in excess of 10% of the reaction mixture be employed.

While the invention may be practiced by a batch procedure involving indirect heat exchange by reaction of the olefinic compound with hydrogen sulphide in the presence of the catalyst, the preferred procedure involves passing the reactants together through a conduit or mixer constituting the reactor and provided with means for abstracting heat from the reaction mixture, since better control of temperature to maintain it at a desirably low point can be attained by such continuous operation than in a batch reactor.

An embodiment of the invention involving continous operation is illustrated in the attached flow sheet. Referring to that flow sheet, hydrogen sulphide from container 10 is fed into confluence with olefin from container 11 by dual pumps 12, through the tubular reactor 14, which is maintained at the desired temperature by the bath 13. The rates of feed of the reactants are regulated by the strokes of the pumps 12, and the rate of feed of catalyst from container 15 is controlled by the needle valve 16, and indicated on the flow meter 17. From the reactor, the mixture passes into the scrubber 18 which is supplied with dilute sodium hydrosulphide solution from tank 19. The stabilized product is introduced next into the decanter 20, where the less dense oil is permitted to separate from the denser aqueous phase and is drawn off into receiver 21. The crude product thus obtained may easily be dried and filtered to give a clear, water white solution.

As an alternative, the reaction may be conducted by permitting a part of the excess hydrogen sulphide to be evaporated in an expansion coil also in bath 13, after leaving the reactor 14. The heat of vaporization thus absorbed by the hydrogen sulphide, incident to its vaporization, is utilized to maintain the reaction mixture at the desirably low temperature or to cool it to such temperature. In such case, the volatilized hydrogen sulphide will, of course, be recycled, after condensation, to the same or a subsequent batch of reaction mixture, in order to be reutilized. This alternative procedure is described and claimed in our co-pending application Serial No. 550,630, filed August 22, 1944.

*Example I*

Tertiary dodecyl mercaptan was prepared by the condensation of tri-isobutylene with anhydrous hydrogen sulphide in the presence of hydrofluoric acid, the reaction being conducted in a steel autoclave of approximately 1 gallon capacity equipped with an agitator. The autoclave was initially charged with 1000 grams of tri-isobutylene and 50 grams of hydrofluoric acid. After bringing the temperature of the charge to 18° C., 1350 grams of anhydrous hydrogen sulphide was added. Agitation was continued for ten additional minutes during which period the temperature rose from 18° C. to 23° C. The crude mercaptan was rapidly discharged, washed with dilute caustic, filtered and separated by fractional distillation under vacuum. There was recovered 260 grams of tertiary dodecyl mercaptan, 30 grams of tertiary butyl mercapton and 680 grams of tri-isobutylene. This corresponds to a conversion of 21.7 percent to the higher mercaptan based on tri-isobutylene.

*Example II*

In the same autoclave tertiary dodecyl mercaptan was prepared by the condensation of tri-isobutylene with anhydrous hydrogen sulphide in the presence of boron trifluoride. The autoclave was charged initially with 1000 grams of tri-isobutylene and 650 grams of hydrogen sulphide. Approximately 70 grams of boron trifluoride was introduced into the reactants which had previously been brought to a temperature of −17° C. by means of an external cooling bath. Agitation was continued for 30 additional minutes during which time the temperature remained near −15° C. The autoclave was then discharged and the crude product rapidly washed with dilute caustic. There was recovered from the washed, filtered crude 216 grams of dodecyl mercaptan and 814 grams of tri-isobutylene. There was no evidence of the presence of lower boiling mercaptans. The conversion to tertiary dodecyl mercaptan was 18.0 percent based on the olefin.

The following two examples illustrate the practice of the invention in continuous operation.

*Example III*

The preparation of tertiary dodecyl mercaptan from hydrogen sulphide and tri-isobutylene in the presence of boron tri-fluoride was conducted in the continuous manner using the apparatus illustrated in the flow sheet. 46 pounds of tri-isobutylene, 33 pounds of hydrogen sulphide and 2.07 pounds of boron tri-fluoride were charged into the reactor at a substantially uniform rate over a period of 125 minutes, corresponding to a contact time of approximately 0.8 minute. The temperature was maintained in the neighborhood of −20° C. A dilute sodium hydrosulphide solution was brought into intimate contact with the mixture in the scrubber 18 to destroy the catalytic activity of the boron fluoride. Heat was supplied in sufficient amount to prevent the freezing of the water by the vaporization of hydrogen sulphide. There was obtained 48.0 pounds of hydrogen sulphide-free crude which yielded 25.3 pounds of light colored tertiary dodecyl mercaptan and 22.5 pounds of tri-isobutylene. This corresponds to a conversion of 45.6 percent.

*Example IV*

In a manner similar to Example III, 95 pounds of hydrogen sulphide, 55 pounds of tri-isobutylene and 2.7 pounds of boron trifluoride were charged into the system at a uniform rate over a period of 195 minutes and at a temperature in the reactor of approximately −30° C. This corresponded to a contact time of about 0.7 minute. There was recovered 63 pounds of hydrogen sulphide-free crude which contained 60.5 pounds of dodecyl mercaptan and 2.5 pounds of tri-isobutylene, involving a conversion of 91.5 percent based on the olefin.

Various modifications are possible within the scope of the invention, and we do not therefore wish to be limited except by the scope of the following claims.

We claim:

1. In the manufacture of tertiary dodecyl mercaptan, the process comprising condensing tri-isobutylene with hydrogen sulfide by contacting the tri-isobutylene with a stoichiometric excess of hydrogen sulfide in the presence of an inorganic halide catalyst for the polymerization and depolymerization of olefins chosen from the class consisting of hydrogen fluoride, boron fluoride, aluminum chloride, beryllium chloride, zinc chloride, boron chloride, phosphorus pentafluoride, arsenic trifluoride, stannic chloride, titanium tetrachloride and antimony pentafluoride, the reaction temperature being maintained below 0° C., and the halide catalyst from the above-named class being the principal and essential catalytic constituent of the reaction mixture.

2. In the condensation of olefins with hydrogen sulfide to form mercaptans having the sulfhydryl radical attached to a non-terminal carbon atom, the process comprising mixing the olefin with hydrogen sulfide in quantity sufficient to condense with said olefin, and condensing the olefin with the hydrogen sulfide by means of an inorganic halide catalyst for the polymerization and depolymerization of olefins chosen from the class consisting of hydrogen fluoride, boron fluoride, aluminum chloride, beryllium chloride, zinc chloride, boron chloride, phosphorus pentafluoride, arsenic trifluoride, stannic chloride, titanium tetrachloride and antimony pentafluoride, the reaction temperature being maintained below 100° C. and the halide catalyst from the above-named class being the principal and essential catalytic constituent of the reaction mixture.

3. In the condensation of open chain olefins with hydrogen sulfide to form mercaptans having the sulfhydryl radical attached to a non-terminal carbon atom, the process comprising mixing the olefin with hydrogen sulfide in quantity sufficient to condense with said olefin, and condensing the olefin with the hydrogen sulfide by means of an inorganic halide catalyst for the polymerization and depolymerization of olefins chosen from the class consisting of hydrogen fluoride, boron fluoride, aluminum chloride, beryllium chloride, zinc chloride, boron chloride, phosphorus pentafluoride, arsenic trifluoride, stannic chloride, titanium tetrachloride and antimony pentafluoride, the reaction temperature being maintained below 50° C. and the halide catalyst from the above-named class being the principal and essential catalytic constituent of the reaction mixture.

4. In the condensation of open chain olefins with hydrogen sulfide to form mercaptans having the sulfhydryl radical attached to a non-terminal carbon atom, the process comprising effecting the condensation reaction by contacting the olefin with the hydrogen sulfide in stoichiometric excess in the presence of an inorganic halide catalyst for the polymerization and depolymerization of olefins chosen from the class consisting of hydrogen fluoride, boron fluoride, aluminum chloride, beryllium chloride, zinc chloride, boron chloride, phosphorus pentafluoride, arsenic trifluoride, stannic chloride, titanium tetrachloride and antimony pentafluoride, the reaction temperature being maintained below 100° C. and the halide catalyst from the above-named class being the principal and essential catalytic constituent of the reaction mixture.

5. In the condensation of open chain olefins with hydrogen sulfide to form mercaptans having the sulfhydryl radical attached to a non-terminal carbon atom, the process comprising mixing the olefin with hydrogen sulfide in quantity sufficient to condense with said olefin, and condensing the olefin with the hydrogen sulfide by means of a catalyst consisting essentially of boron fluoride, the reaction temperature being maintained below 100° C. and said boron trifluoride being the principal and essential catalytic constituent of the reaction mixture.

6. In the condensation of olefins with hydrogen sulfide to form tertiary alkyl mercaptans having from 8 to 20 carbon atoms in their alkyl radicals, the process comprising effecting the condensation reaction by contacting a tertiary olefin having from 8 to 20 carbon atoms resulting from polymerizaton of a lower olefin with the hydrogen sulfide in the presence of an inorganic halide catalyst for the polymerization and depolymerization of olefins chosen from the class consisting of hydrogen fluoride, boron fluoride, aluminum chloride, beryllium chloride, zinc chloride, boron chloride, phosphorus pentafluoride, arsenic trifluoride, stannic chloride, titanium tetrachloride and antimony pentafluoride, the reaction temperature being maintained below 50° C. and the halide catalyst from the above-named class being the principal and essential catalytic constituent of the reaction mixture.

7. In the condensation of olefins with hydrogen sulfide to form tertiary alkyl mercaptans having from 8 to 20 carbon atoms in their alkyl radicals, the process comprising effecting the condensation reaction by contacting a tertiary olefin having from 8 to 20 carbon atoms resulting from polymerization of a lower olefin with the hydrogen sulfide in the presence of an inorganic halide catalyst for the polymerization and depolymerization of olefins chosen from the class consisting of hydrogen fluoride, boron fluoride, aluminum chloride, beryllium chloride, zinc chloride, boron chloride, phosphorus pentafluoride, arsenic trifluoride, stannic chloride, titanium tetrachloride and antimony pentafluoride, the reaction temperature being maintained below 0° C. and the halide catalyst from the above-named class being the principal and essential catalytic constituent of the reaction mxture.

8. In the condensation of olefins with hydrogen sulfide to form tertiary alkyl mercaptans having from 8 to 20 carbon atoms in their alkyl radicals, the process comprising effecting the condensation reaction by contacting a tertiary olefin having from 8 to 20 carbon atoms resulting from polymerization of a lower olefin with the hydrogen sulfide in the presence of a catalyst consisting essentially of boron fluoride, the reaction temperature being maintained below 50° C. and said boron trifluoride being the principal and essential catalytic constituent of the reaction mixture.

JOHN F. OLIN.
JOHN L. EATON.

REFERENCES CITED

The following references are of record in the file of this patent:

UNITED STATES PATENTS

| Number | Name | Date |
|---|---|---|
| 1,836,170 | Johansen | Dec. 15, 1931 |
| 2,052,268 | Williams et al. | Aug. 25, 1936 |
| 2,101,096 | Reuter et al. | Dec. 7, 1937 |
| 2,296,399 | Otto et al. | Sept. 22, 1942 |
| 2,366,453 | Meadow | Jan. 2, 1945 |

FOREIGN PATENTS

| Number | Country | Date |
|---|---|---|
| 667,308 | France | Oct. 15, 1929 |
| 801,762 | France | Aug. 17, 1936 |

OTHER REFERENCES

Duffey et al., "Ind. and Eng. Chemistry," Jan. 1934, pp. 91–93.

Thomas, "Anhydrous Aluminum Chloride in Organic Chemistry," Reinhold, N. Y., 1941, pp. 867, 688.